(12) United States Patent
Niegemann

(10) Patent No.: US 12,259,855 B1
(45) Date of Patent: Mar. 25, 2025

(54) SYSTEM AND METHOD FOR COMPRESSION OF STRUCTURED METASURFACES IN GDSII FILES

(71) Applicant: Ansys, Inc., Canonsburg, PA (US)

(72) Inventor: Jens Niegemann, North Vancouver (CA)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 18/374,227

(22) Filed: Sep. 28, 2023

(51) Int. Cl.
| | | |
|---|---|---|
| G06F 16/00 | (2019.01) | |
| G02B 1/00 | (2006.01) | |
| G02B 3/08 | (2006.01) | |
| G02B 5/18 | (2006.01) | |
| G06F 16/11 | (2019.01) | |
| G06F 16/13 | (2019.01) | |
| G06F 16/18 | (2019.01) | |

(Continued)

(52) U.S. Cl.
CPC ............ *G06F 16/21* (2019.01); *G02B 1/002* (2013.01); *G02B 3/08* (2013.01); *G02B 5/1861* (2013.01); *G06F 16/128* (2019.01); *G06F 16/13* (2019.01); *G06F 16/18* (2019.01); *G06F 16/26* (2019.01); *G06F 16/41* (2019.01); *G06F 16/51* (2019.01)

(58) Field of Classification Search
CPC .. G06F 16/21–26; G06F 16/128; G06F 16/13; G06F 16/18; G06F 16/41; G06F 16/51; G02B 1/002; G02B 5/1861; G02B 5/1871; G02B 5/3025; G02B 27/286; G02B 27/288; G02B 3/08; G02B 21/1361; G01B 11/24; G01B 9/08
See application file for complete search history.

(56) References Cited

U.S. PATENT DOCUMENTS

| 10,976,804 B1 * | 4/2021 | Atlas ................. G06F 3/017 |
| 2004/0128643 A1 * | 7/2004 | Buechner .............. G03F 1/84 430/5 |

(Continued)

FOREIGN PATENT DOCUMENTS

| WO | WO 2011149808 A2 * | 12/2011 |
| WO | WO 2022235826 A2 * | 11/2022 |
| WO | WO 2023084401 A1 * | 5/2023 |

OTHER PUBLICATIONS

M. Alper Selver et al., "The effects of geometric scattered signal waveform modeling on target identification performance", May 2017 11th European Conference on Antennas and Propagation (EUCAP), pp. 1087-1090.*

*Primary Examiner* — Srirama Channavajjala
(74) *Attorney, Agent, or Firm* — WOMBLE BOND DICKINSON (US) LLP

(57) ABSTRACT

A system receives a layout representation of a metasurface, the metasurface including a number of scatterers arranged in a spatial order, each scatterer having one of a number of geometries. The system identifies one or more consecutive ones of the scatterers in the spatial order. The system identifies a sequence representing consecutive ones of the geometries, the sequence being associated with one or more consecutive ones of the scatterers in the spatial order. The system associates a two-dimensional coordinate to the sequence, the two-dimensional coordinate corresponding to a position in the metasurface where the sequence starts. The system generates an output layout file including a reference to the sequence and the associated two-dimensional coordinate.

18 Claims, 13 Drawing Sheets

(51) Int. Cl.
    *G06F 16/21*     (2019.01)
    *G06F 16/26*     (2019.01)
    *G06F 16/41*     (2019.01)
    *G06F 16/51*     (2019.01)

(56) References Cited

U.S. PATENT DOCUMENTS

| | | | |
|---|---|---|---|
| 2016/0025914 A1* | 1/2016 | Brongersma | G02B 5/001 |
| | | | 359/489.07 |
| 2019/0025477 A1* | 1/2019 | She | G02B 27/0012 |
| 2021/0063717 A1* | 3/2021 | Valentine | G02B 1/002 |
| 2021/0318467 A1* | 10/2021 | Zhou | G02B 1/002 |
| 2022/0299760 A1* | 9/2022 | Fan | G02B 27/0012 |
| 2023/0260239 A1* | 8/2023 | Cheung | G06T 3/04 |
| | | | 345/619 |
| 2023/0367114 A1* | 11/2023 | Bos | G02B 27/0012 |

* cited by examiner

Layout File

Dictionary:
0
1
2
3
4

Structure:
ref to 3 at position 0,0
ref to 1 at position 1,0
ref to 2 at position 2,0
ref to 2 at position 3,0
ref to 3 at position 4,0
ref to 3 at position 5,0
ref to 4 at position 6,0
...
ref to 1 at position 0,1
ref to 2 at position 1,1
ref to 3 at position 2,1
...

FIG. 3C

Layout File

Dictionary:
0
1
2
3
4
5 ref(3), ref(1)
6 ref(2), ref(2)
7 ref(3), ref(3)
8 ref(4), ref(0)
9 ref(0), ref(2)
10 ref(5), ref(0)

Structure:
ref to 5 at position 0,0
ref to 6 at position 2,0
ref to 7 at position 4,0
ref to 8 at position 6,0
ref to 9 at position 8,0
...

FIG. 4C

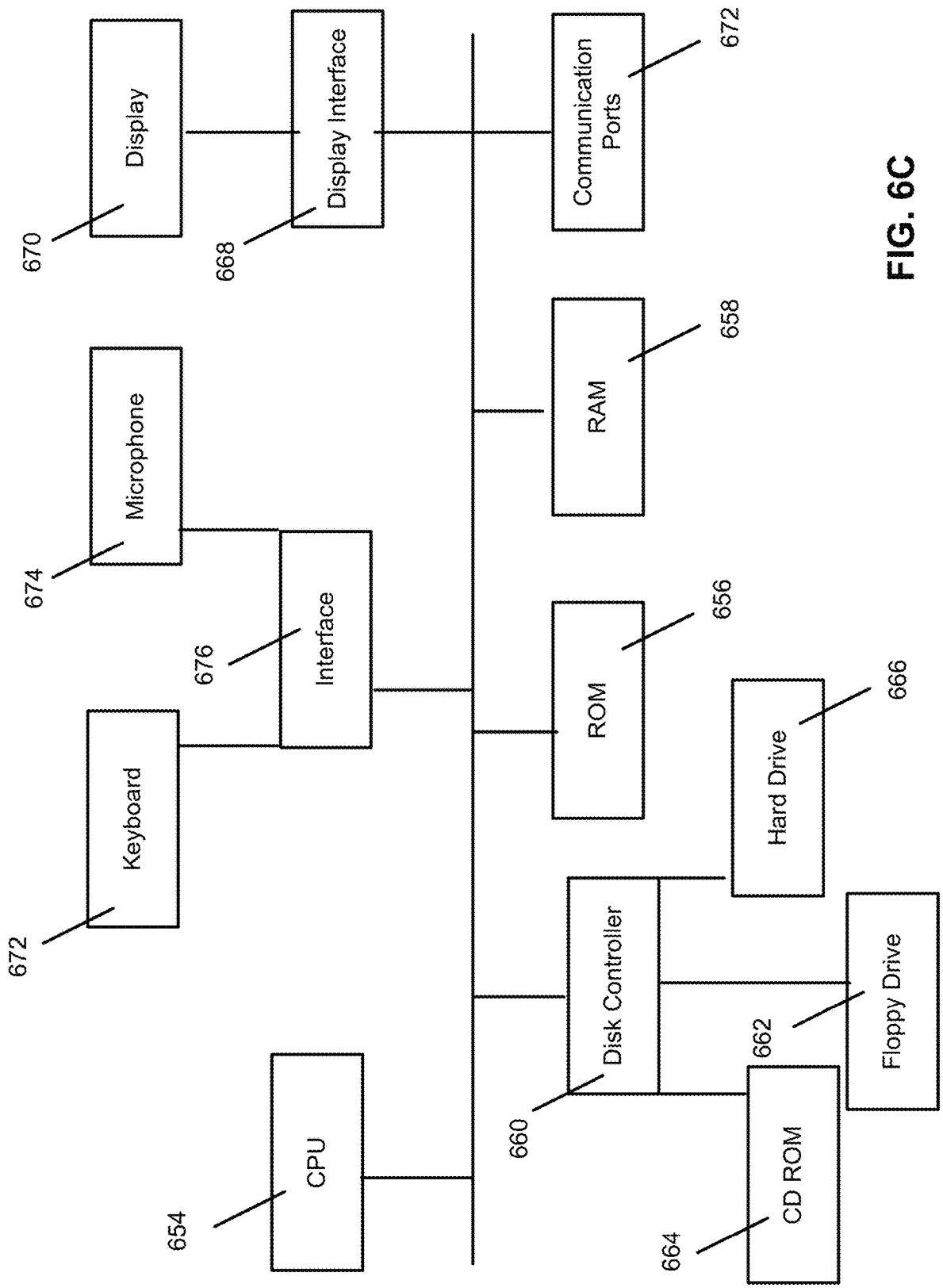

SYSTEM AND METHOD FOR COMPRESSION OF STRUCTURED METASURFACES IN GDSII FILES

FIELD OF THE INVENTION

Embodiments of the present invention relate generally to planar optical elements (metasurfaces). More particularly, embodiments of the invention relate to system and method for compression of structured metasurfaces in gdsII files.

BACKGROUND

A metasurface, also known as metamaterial, is a class of material that is designed with unique micro and nanoscale patterns. The unique patterns cause the metasurface to interact with light, radio waves, acoustic, and/or other energetic waves. For example, the unique pattern can manipulate the amplitude, phase, and polarization of light to provide control over wavefronts and signal propagation.

Metasurface design approaches have often relied on custom designs created using specialized software. In the context of metasurface fabrication and design, GDSII (Graphic Data System II) is a prevalent file format that is also used for semiconductors in photomasks and integrated circuit layouts. GDSII files are widely adopted by the semiconductor industry and offer an efficient means of representing geometric patterns of a metasurface in nanometer scale.

In order to design a large metasurface in the orders of millimeters, individual scatterers in nanometer scale, as combinations of polygons in a gdsII file, can lead to very large (in the hundreds of gigabytes) file size. A file with large file size takes a long time for a computer to read and/or write and is difficult to handle.

SUMMARY OF THE DESCRIPTION

A system models a planar metasurface structure, e.g., metamaterials, and generates a compressed file for the model using a dictionary-based lossless compression algorithm. The metamaterial or metasurface structure can include a plurality of scatterers in a spatial order. Each scatterer can have a unique geometry comprised of one or more polygons having unique vertices and/or positions for the vertices. The dictionary-based lossless compression algorithm uses a dictionary to hierarchically map individual scatterers or sequences of scatterers to indices. The model structure then references corresponding indices when the sequences appear in the metasurface structure. The model structure, as part of the compressed file, then references the indices from the dictionary when these sequences of scatterers appear in the metasurface structure. Because unique sequences of scatterers are references by indices, the compressed file requires a smaller file size in comparison to an uncompressed file.

For an embodiment, the system receives a layout representation of a metasurface in the metasurface device, the metasurface including a number of scatterers arranged in a spatial order, each scatterer having one of a number of geometries. The metasurface can be of any shapes or sizes (circle, rectangle, star, square, or other unstructured shapes). The system identifies one or more consecutive ones of the scatterers in the spatial order. The system identifies a sequence representing consecutive ones of the geometries, the sequence being associated with one or more consecutive ones of the scatterers in the spatial order. The system associates a two-dimensional coordinate to the sequence, the two-dimensional coordinate corresponding to a position where the consecutive ones of the geometries are located according to the layout representation of the metasurface. The system generates an output layout file including a reference to the sequence and the associated two-dimensional coordinate. Thus, the output layout file has a significantly reduced file size by referencing existing scatterers.

For an embodiment, the system further instructs the fabrication of the metasurface device based on the output layout file using a lithographic process.

For an embodiment, the layout representation is a two-dimensional array of metasurface scatterers arranged in a spatial order including a rectangular arrangement, a circular arrangement, a hexagonal arrangement, a spiral arrangement, or a chain arrangement.

For an embodiment, the system further stores the output layout file as a graphical design system binary file.

For an embodiment, the output layout file further includes a special value and associated coordinates corresponding to the special value, the special value indicating that there is absent of metasurface scatterers at the associated coordinates.

For an embodiment, the system further initializes the dictionary with a set of records of single unique metasurface scatterers.

For an embodiment, a dictionary including a plurality of records, and each record includes either a single unique metasurface scatterer or a unique sequence of metasurface scatterers.

For an embodiment, the system further appends the unique sequence of metasurface scatterers to the dictionary as a new record comprising appending the unique sequence of metasurface scatterers to the dictionary as references to two existing sequences of metasurface scatterers in the dictionary.

For an embodiment, each sequence of metasurface scatterers in the dictionary includes references to two existing records in the dictionary in a hierarchical manner, and a count of metasurface scatterers in the sequence of metasurface scatterers is equal to a sum of counts of metasurface scatterers in the two existing records.

For an embodiment, a sequence of metasurface scatterers are identified as unique when the sequences of metasurface scatterers are not yet present in the dictionary.

For an embodiment, a subsequent sequence of metasurface scatterers in the metasurface structure are referenced to an index of a record in the dictionary when a subset of the subsequent sequences of metasurface scatterers match a sequence of metasurface scatterers in the record in the dictionary.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in nonvolatile memory, such as flash memory, or dynamic random access memory (DRAM) which is volatile or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 3C depicts a layout file according to one embodiment.

FIG. 4C depicts a layout file according to one embodiment.

FIGS. 6A-6C depict example systems for use in implementing a system according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "For an embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and embodiments described herein can be used in the context of modeling/simulation systems (such as a data processing system that executes simulation software from Ansys Inc.) that can be used to design a metasurface device for fabrication and/or simulation.

Figure 1:
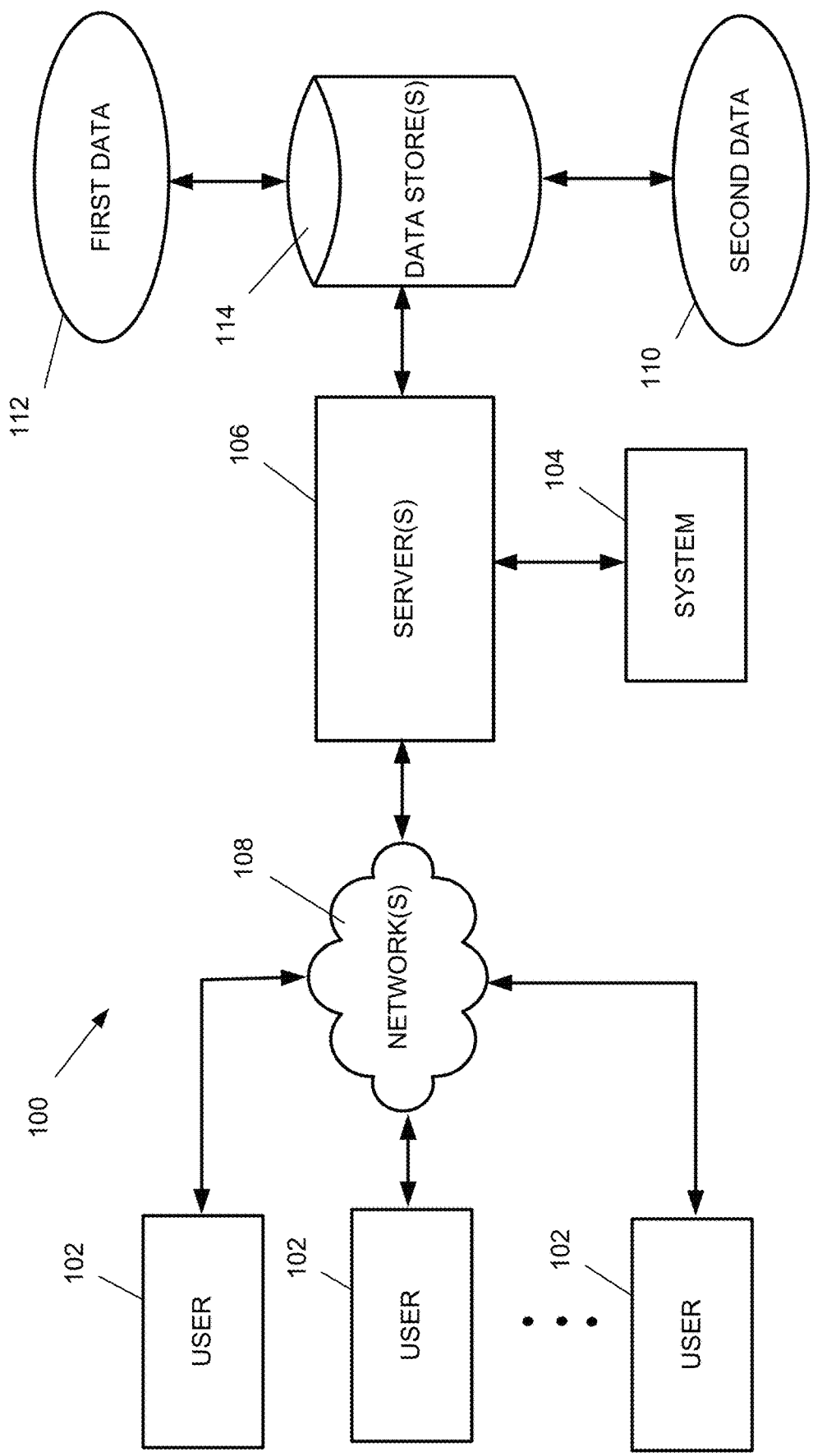
FIG. 1 is a block diagram illustrating a networked system according to one embodiment.

FIG. 1 depicts at a computer-implemented environment 100 wherein users 102 can interact with a system 104 hosted on one or more servers 106 through a network 108. The system 104 contains software operations or routines. The users 102 can interact with the system 104 in a number of ways, such as over one or more networks 108. One or more servers 106 accessible through the network(s) 108 can host system 104. Servers 106 and system 104 may store data (e.g., first data 112 and second data 110) in one or more data stores 114 coupled to the one or more server 106. It should be understood that the system 104 could also be provided on a stand-alone computer for access by a user. Note the system 104 can also be accessed through an application programmable interface (API). Inputs to the system 104 may include structural designs, such as a printed circuit board design, to be modeled and simulated under one or more operating conditions.

Figure 2A:
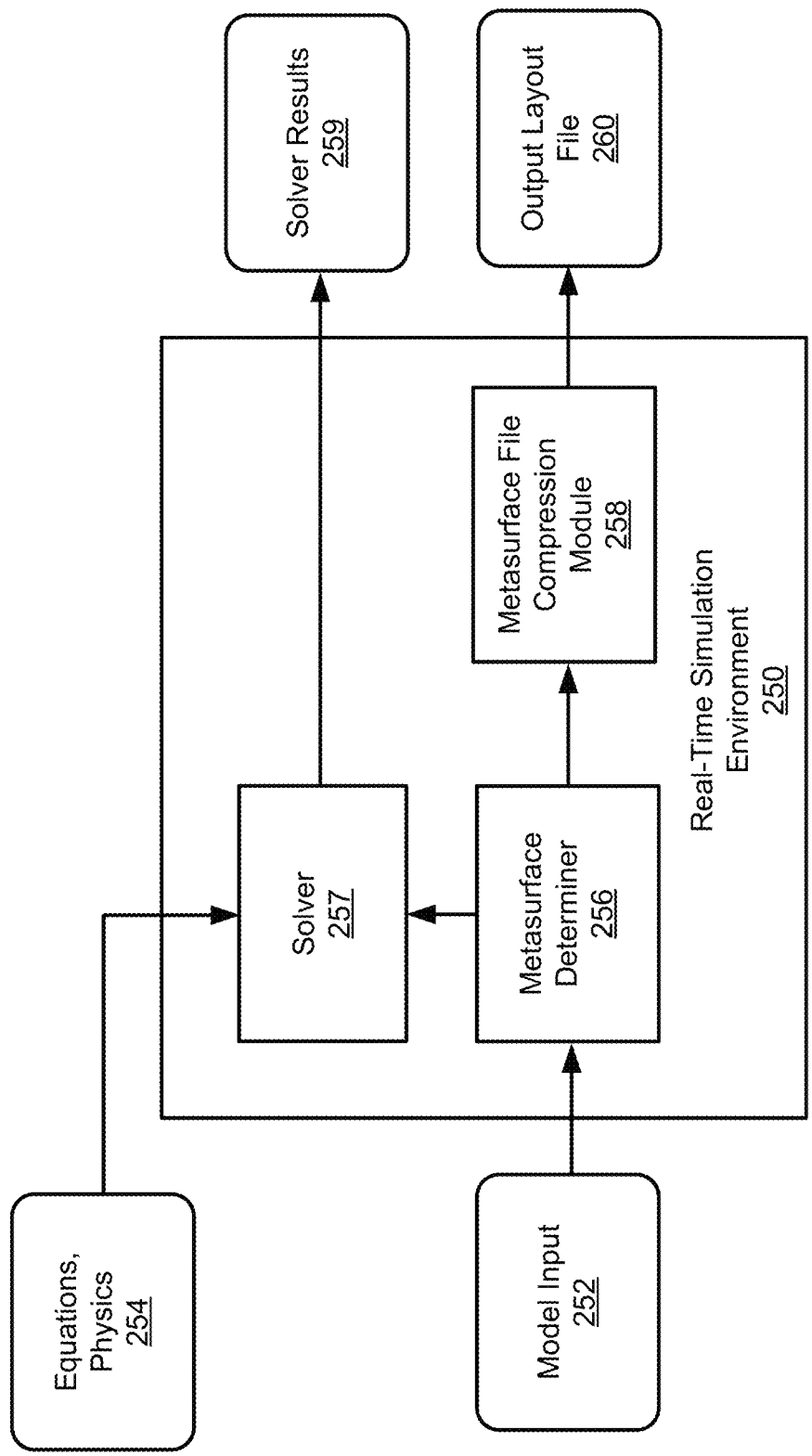
FIG. 2A is a block diagram illustrating an example of a real-time simulation environment according to one embodiment.

FIG. 2A is a block diagram illustrating an example of a real-time simulation environment 250 according to one embodiment. Real-time simulation environment 250 can simulate a 1D, 2D, or 3D physical system for different characteristics, such as optical, mechanical, fluid dynamics, electromagnetics, aerodynamics, etc. For an embodiment, real-time simulation environment can simulate planar optical elements for optical characteristics. Planar optical elements can control a wavefront of incident light by using arrays of features such as fixed optical phase shifters, amplitude modulators, and/or polarization changing elements. The features of planar optical elements are patterned on a surface to introduce a desired spatial distribution of optical phases, amplitudes, and/or polarizations of the light. Planar optical elements can include a metasurface. Metasurfaces include numerous small optical elements (also referred to as scatterers, metasurface elements, or metasurface features). The small optical elements can be spaced apart by a distance that is less than the distance corresponding to a wavelength of light. By reducing the spacing of the metasurface elements, diffraction orders (such as those seen in diffraction gratings or convention diffractive optical elements) can be suppressed, thus improving performance and efficiency of the metasurface device. The metasurface elements can also be spaced apart by a larger distance. Metasurfaces can provide a versatile platform to locally modulate the phases, amplitudes, and/or polarizations of an incident wavefront. The metasurfaces may be used in various compact optical elements, such as lenses, polarimeters, axicons, holograms, etc. A device that includes at least one metasurface is called a metasurface device.

Referring to FIG. 2A, simulation environment 250 includes a metasurface determiner 256 and metasurface file compression module 258. Metasurface determiner 256 can receive a model input 252 and determine the metasurface device within the model. Metasurface file compression module 258 can perform a compression on a metasurface in the input and generate a compressed layout file 260 compressing the metasurface. For an embodiment, compressed layout file 260 can be stored in a local data store or transmitted to a user over the network.

In some embodiments, simulation environment 250 can include a solver 257, such as a finite-difference time-domain (FDTD) solver, or any other types of solver. Solver 257 can solve for a potential solution by applying a set of equations, or physics 254, to a metasurface structure/device to generate solver results 259. Here, the set of equations can describe one or more optical, electro-optical, electromechanical, or optical-mechanical characteristics, or a combination thereof, for the scatterers in the metasurface structure. For an embodiment, solver results 259 can be displayed in a user interface and a user can reconfigure the physical system model or any other inputs in real-time based on the simulation feedbacks.

For an embodiment, model input 252 can include a printed circuit board, integrated circuits, metasurface devices, and/or other optical or electronic components. For an embodiment, metasurface determiner 256 can determine a coordinate location of a metasurface structure in the metasurface device.

Figure 2B:
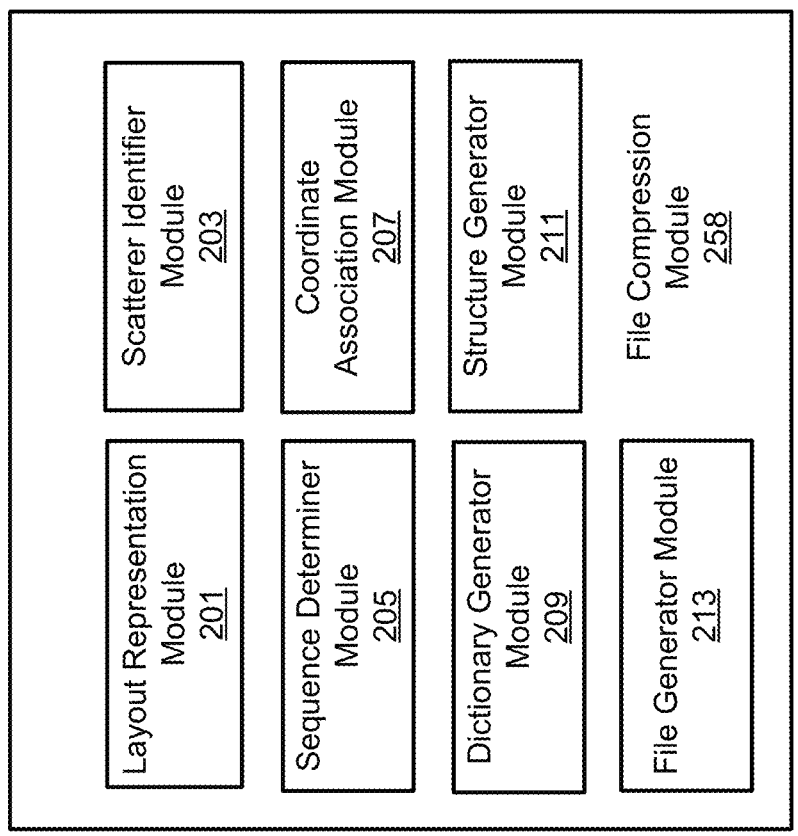
FIG. 2B is a block diagram illustrating an example of metasurface compression module according to one embodiment.
Figure 4A:
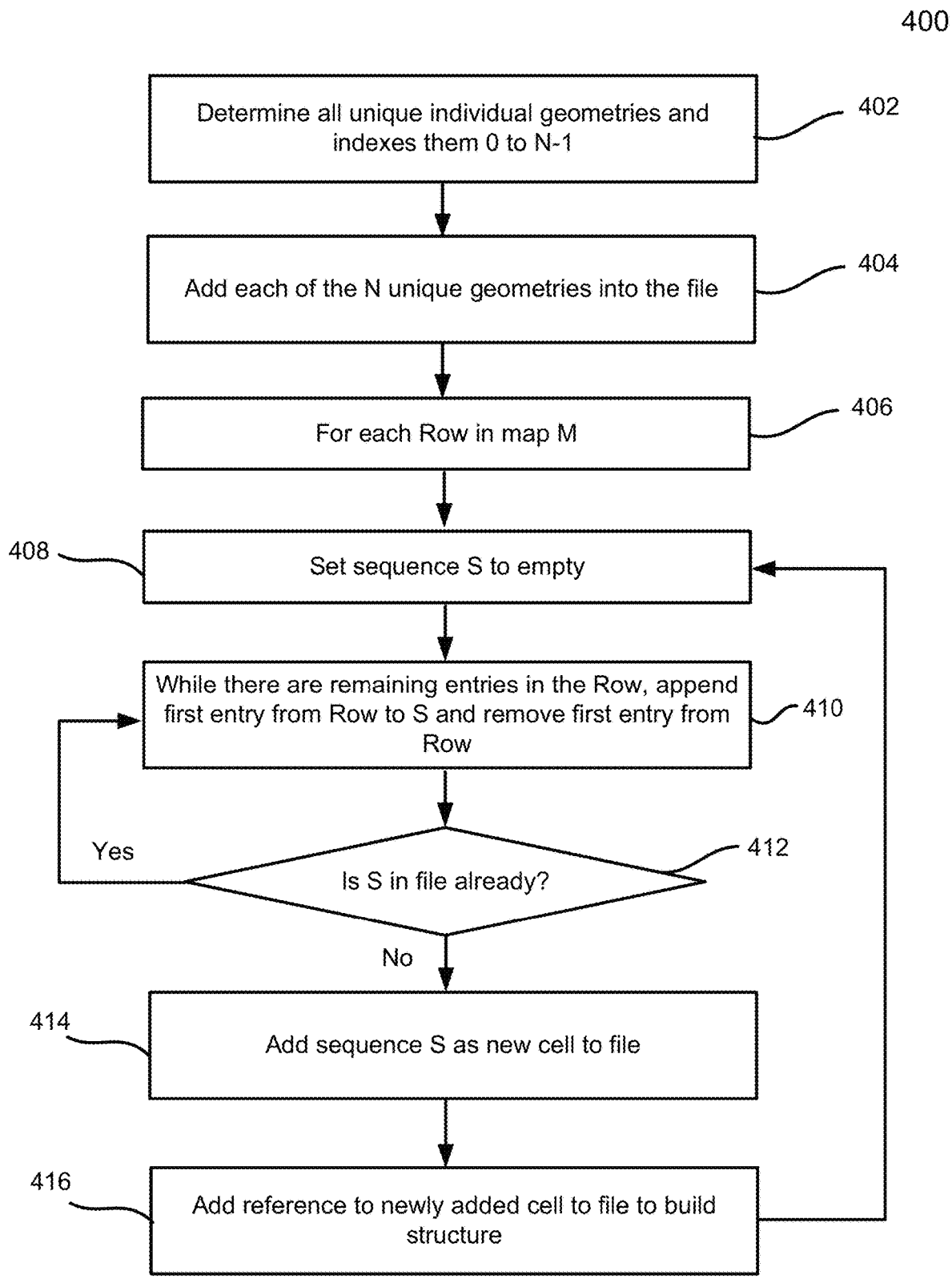
FIG. 4A depicts a flow diagram illustrating an example method for generating a compressed layout file according to one embodiment.
Figure 4B:
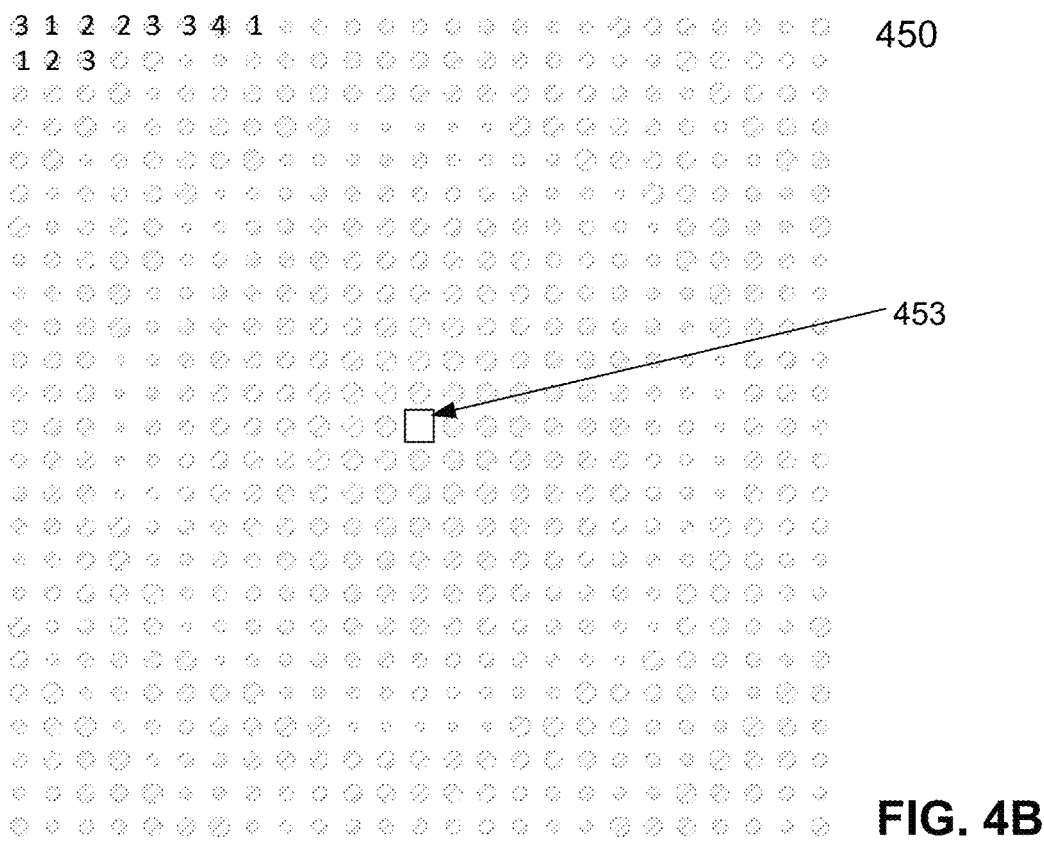
FIG. 4B depicts a metasurface structure according to one embodiment.

File compression module 258 can determine a layout representation for the metasurface structure and generate a file corresponding to the metasurface structure in a lossless compressed format as further detailed with respect to FIGS. 4A-4C. Referring to FIG. 2B, for example, file compression module 258 can include layout representation module 201, scatterer identifier module 203, sequence determiner module 205, coordinate association module 207, output dictionary generator module 209, structure generator module 211, and file generator 213. Layout representation module 201 can determine the two-dimensional (2D) layout of the metasurface structure. Scatterer identifier module 203 can identify the individual scatterers in the metasurface structure. Sequence determiner module 205 can determine the unique sequences of scatterers. Coordinate association module 207 can associate a (x, y) cartesian coordinate to each sequence. Dictionary generator module 209 can generate a dictionary listing and add indices for unique sequences to the dictionary. Structure generator module 211 can generate a structure listing that references the indices corresponding to the sequences in the dictionary. File generator module 213 can generate a layout file having a dictionary listing and a structure listing, where the structure listing has references to indices corresponding to the unique sequences in the dictionary, so that the structure listing can be used to model a metasurface structure. Some of modules 201-213 can be integrated into a single module.

Figure 3A:
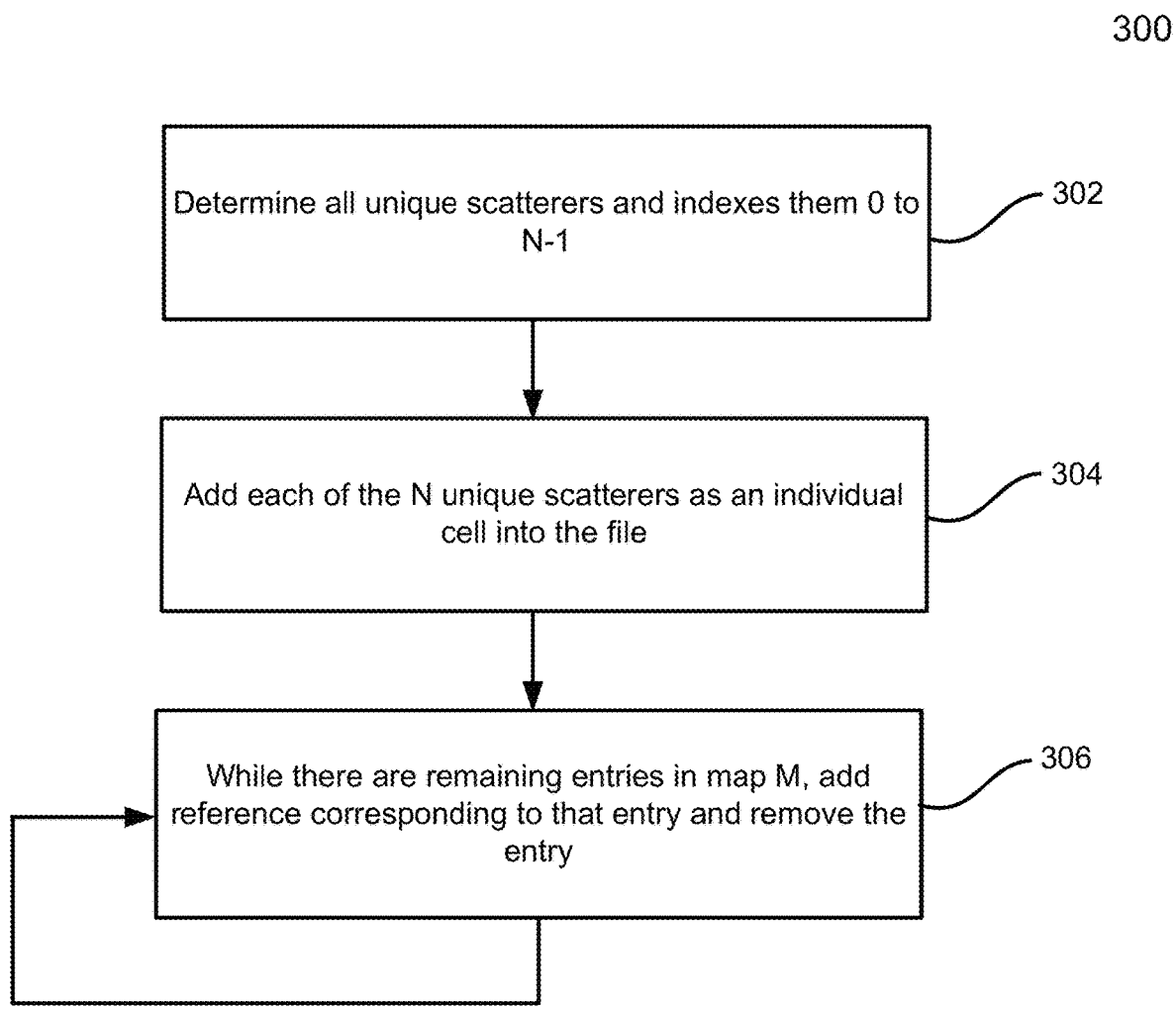
FIG. 3A depicts a flow diagram illustrating an example method for generating a layout file according to one embodiment.
Figure 3B:
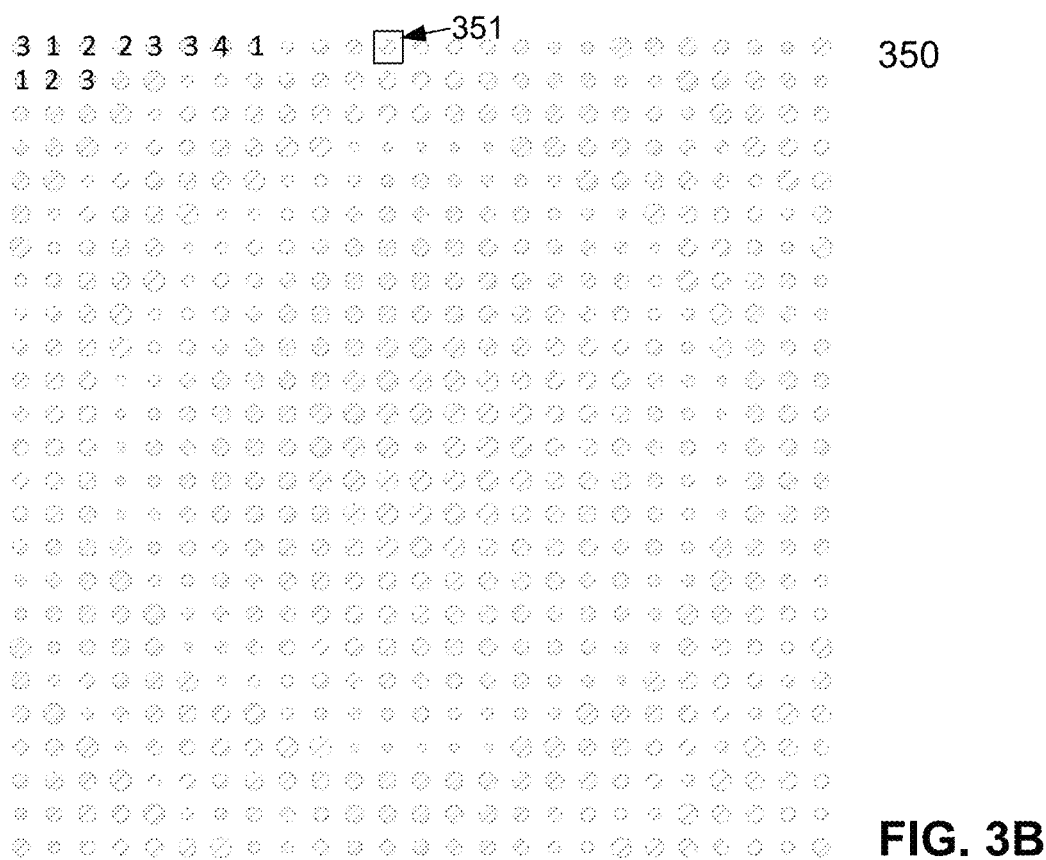
FIG. 3B depicts a metasurface structure according to one embodiment.

FIG. 3A depicts a flow diagram illustrating an example method for generating a layout file according to one embodiment. Process 300 may be performed by processing logic which may include software, hardware, or a combination thereof. For example, process 300 can be performed by data processing system 104 of FIG. 1. Process 300 can output a layout file for a metasurface structure, where the metasurface structure is representative of a mapping of M scatterers, where M is an integer value greater than 1. The map structure includes a list of indices referenced from a dictionary list. An example map, e.g., M={3, 1, 2, 2, 3, 4, . . . }, is shown as structure 350 of FIG. 3B. In structure 350, each cell 351 corresponds to a scatterer. Each scatterer can have a unique geometry represented by a number of vertices and/or positions of the vertices. Each (x, y) coordinate in the metasurface structure has a cell and the cell can include a scatterer or a hole that is absent of a scatterer.

Referring to FIG. 3A, at block 302, optionally, processing logic determines all unique scatterers found in the metasurface structure and indexes them 0 to N−1, where N is an integer value greater than 1. For example, processing logic can scan through the M scatterers in the metasurface structure 350 of FIG. 3B and identify the N=5 unique scatterers.

At block 304, processing logic adds each of the unique scatterers as an individual cell into a layout file. For example, individual unique scatterers are added into a dictionary (as shown in the dictionary of FIG. 3C) of the layout file so that the individual scatterers can be subsequently referenced from the dictionary.

At block 306, for each entries in map M (e.g., each cell in the metasurface structure), processing logic adds a reference corresponding to that entry (cell) and remove the entry (as shown in the structure of FIG. 3C). For example, for the metasurface structure shown in FIG. 3B, processing logic scans through each row. In the first row (row=0), the structure has scatterers corresponding to indices=3, 1, 2, 2, 3, 3, 4, 1, . . . . The structure of scatterers are referenced from the dictionary correspondingly as shown in FIG. 3C. Similar for the second row (row=1), the structure has scatterers corresponding to indices=0, 1, 2, 3, . . . and the scatterers are referenced to the indices of the dictionary. Through referencing the indices, the metasurface structure 350 can be represented by M references for the M scatterers.

FIG. 4A depicts a flow diagram illustrating an example method for generating a compressed layout file according to one embodiment. Process 400 may be performed by processing logic which may include software, hardware, or a combination thereof. For example, process 400 can be performed by file compression module 258 of FIGS. 2A-2B. Process 400 can output a compressed layout file for a metasurface structure, where the metasurface structure is represented by a map (e.g., map 450 of FIG. 4B) of M scatterers, where M is an integer value greater than 1.

Referring to FIG. 4A, at block 402, optionally, processing logic determines all unique individual geometries found in the metasurface structure and index them 0, . . . , N−1, where N is an integer value greater than 1. For example, the indices 0 . . . 4 correspond to the N=5 unique individual geometries shown in FIG. 4C. Note that here, index 0, 1, 2, 3, . . . correspond to particular geometries. E.g., index 1 corresponds to one geometry, index 2 corresponds to another geometry, etc.

At block 404, processing logic adds each of the N unique individual geometries into a layout file. For example, processing logic adds the geometries for indices 0 . . . 4 into a dictionary listing of the layout file. Here, these unique geometries can be subsequently referenced from the dictionary through indices 0 . . . 4. Note that the dictionary can be used as references to the scatterers in all rows of map 450 of FIG. 4B.

At block 406, for each row in the map structure 450, processing logic performs the operations in blocks 408-416.

At block 408, processing logic sets a sequence S to empty, e.g., S={ }. S can be a memory buffer used to identify a sequence of scatterers.

At block 410, processing logic traverse through the scatterers in the row. While there are remaining scatterers in the row, processing logic appends a first entry in the row to S, e.g., S=(S+first entry) and removes the first entry from the row.

For example, for the first row (row=0) of {3, 1, 2, 2, 3, 3, 4, . . . }, processing logic appends 3 to S, e.g., S={3}. 3 is then removed from the first row, and the first row becomes {1, 2, 2, 3, 3, 4, . . . }.

At block 412, processing logic determines if the content of S is in the dictionary. If yes, processing logic proceeds to block 410. If not, processing logic proceeds to block 414.

Here, S={3} is found in dictionary for index=3, thus, processing logic proceeds to block 410. Next, at block 410, cell "1" in the first row is appended to S, e.g., S={3, 1}. Since the consecutive geometries {3, 1} is not in the dictionary, processing logic proceeds to block 414. Note that, subsequent sequences with {3, 1, x} can then be referenced using index=5 in a hierarchical manner, where x is an index corresponding to the single unique scatterers, e.g., index=0 . . . 4.

At block 414, processing logic appends the content of sequence S, e.g., the geometries, in the dictionary. The content of sequence S can be appended as references to other indices in a hierarchical manner.

For example, processing logic adds geometries {3, 1} as index=5 in the dictionary.

At block 416, processing logic adds a reference to sequence S to the structure listing and associate an (x, y) coordinate to the reference, where the (x, y) coordinate indicates a start coordinate of the referenced sequence.

For example, processing logic adds a reference to index=5 into the structure listing with a starting position of (x, y)=(0, 0), as shown in FIG. 4C.

Next, processing logic proceeds to block 408 and clears S. For the next cell, processing logic appends '2' into S. E.g., S={2}. Since {2} is found in the dictionary, processing logic proceeds to block 410. Next, processing logic appends geometry '2' into sequence S. E.g., S={2, 2}. Since S={2, 2} is not in the dictionary, processing logic proceeds to block 414 and adds an entry with index=6 into the dictionary. At block 416, processing logic adds a reference to index 6 into the structure list corresponding to the sequence with geometries {2, 2} and associate the sequence having the geometries {2, 2} to coordinates with a starting position of (x, y)=(2, 0). Processing logic would iteratively perform the operations of blocks 406-416 for each cell in map M until processing logic reaches the end of map M. Note that the number of scatterers in the metasurface structure is much greater than the number of geometries and/or consecutive ones of the geometries. Thus, using the limited number of geometries, and consecutive ones thereof, to identify the scatterers in the metasurface leads to compression.

FIG. 4C shows an example of a dictionary and a structure in a layout file corresponding to a number of iterations of process 400. Here, the dictionary is stored as part of the layout file and is used to reference scatterers in any rows of the metasurface structure. Thus, using the references hierarchically, the structure listing has fewer than M references for the map of M scatterers, leading to a compression in the layout file.

Referring to FIG. 4B, for an embodiment, processing logic can set a special character (e.g., -1) to denote an absent of scatterers at a particular location in the structure, such as absent scatterer 453. This way, a metasurface structure with holes (absent of scatterers) can be represented using the compression process 400 of FIG. 4A.

When reading the layout file, processing logic can parse through the structure listing and retrieves the scatterers according to the referenced dictionary entries to reconstruct the metasurface model.

Figure 5:
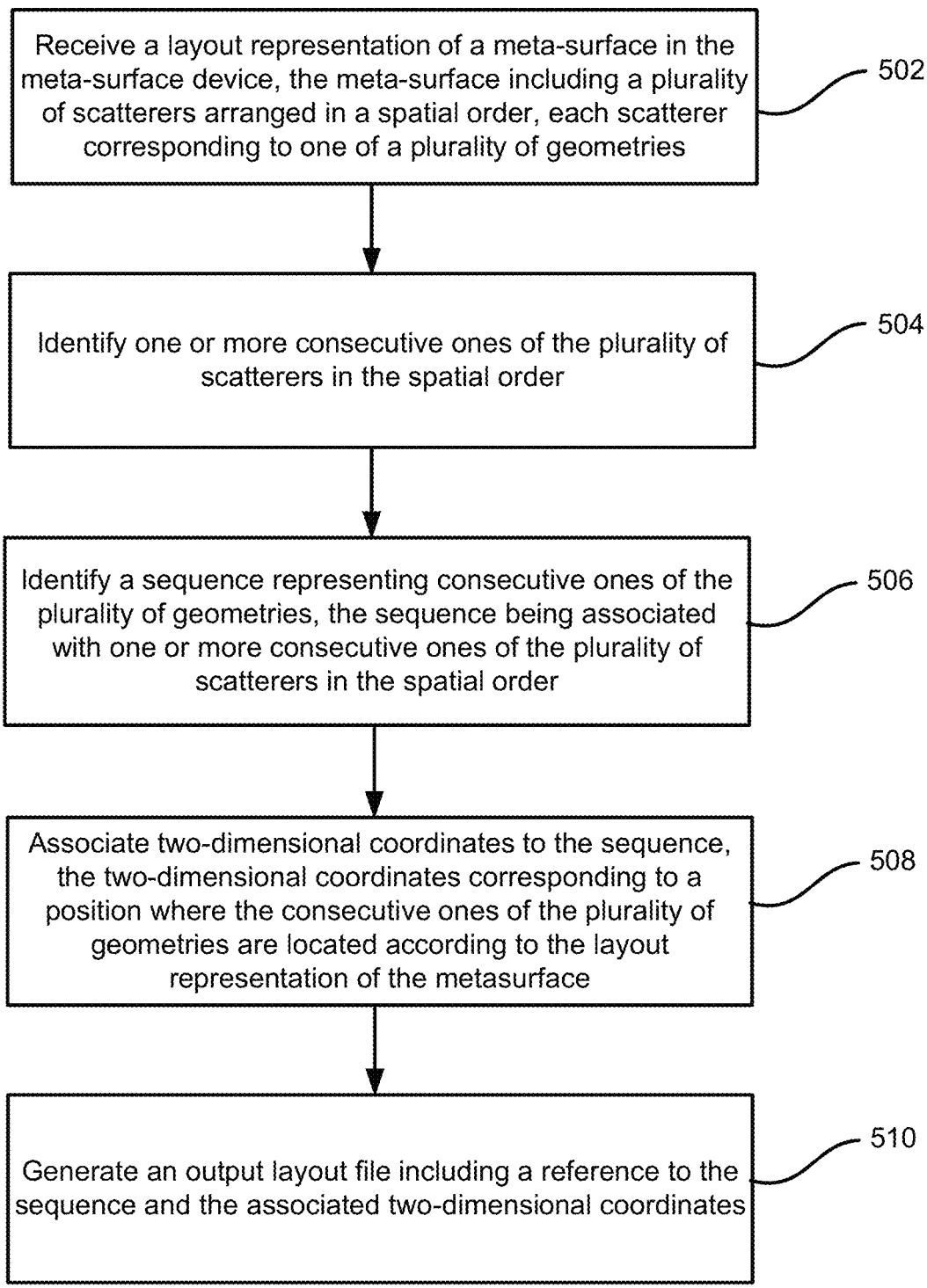
FIG. 5 depicts a flow diagram illustrating an example method for generating a compressed layout file having a metasurface structure according to one embodiment.

FIG. 5 depicts a flow diagram illustrating an example method for generating a compressed layout file having a metasurface structure according to one embodiment. Process 500 may be performed by processing logic which may include software, hardware, or a combination thereof. For example, process 500 can be performed by file compression module 258 of FIGS. 2A-2B. Process 500 can output a compressed layout file for a metasurface device. The metasurface device can include a planar structure of metamaterial.

At block 502, processing logic receives a layout representation of a meta-surface in the meta-surface device, the meta-surface including a plurality of scatterers arranged in a spatial order, each scatterer having one of a plurality of geometries. For example, the layout representation can be input by a user in a layout CAD/scripting tool, such as Lumerical™ by Ansys®. In some embodiments, the layout representation can be included in a file opened by a software application, such as a binary layout file (e.g., gdsII file, or an oasis file) and/or a script file.

At block 504, processing logic identifies one or more consecutive ones of the plurality of scatterers in the spatial order. Here, the layout representation can include a plurality of cells arranged on a planar surface. Each cell can include a scatterer in a particular geometry or an absent of scatterer. Each scatterer can have a unique geometry represented by one or more polygons having unique vertices and/or positions for the vertices. In some embodiments, the scatterers are arranged in a predetermined pattern, such as a rectangle, square, circle, or any other shapes. In some embodiments, the scatterers are randomly arranged in no particular pattern.

Figure 7C:
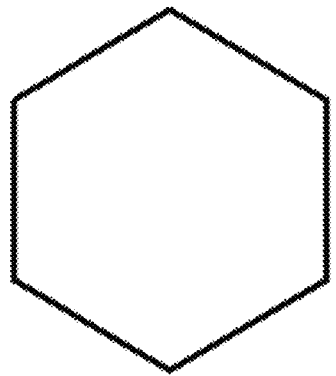
FIGS. 7A-7E depict examples of various spatial arrangements according to some embodiments.
Figure 7B:
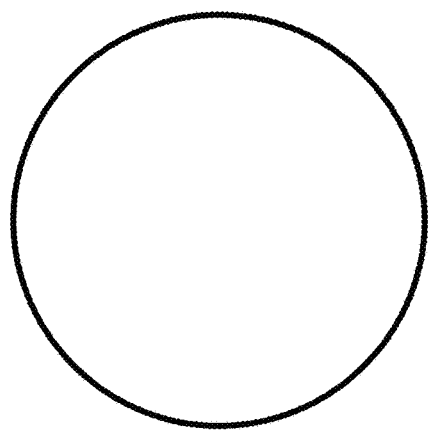
Figure 7E:
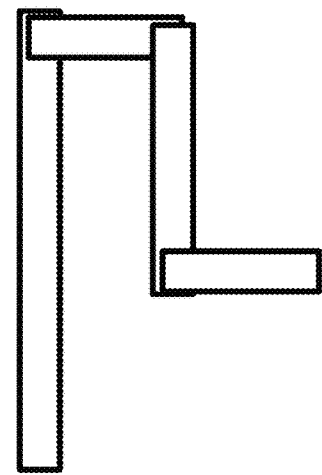
Figure 7A:
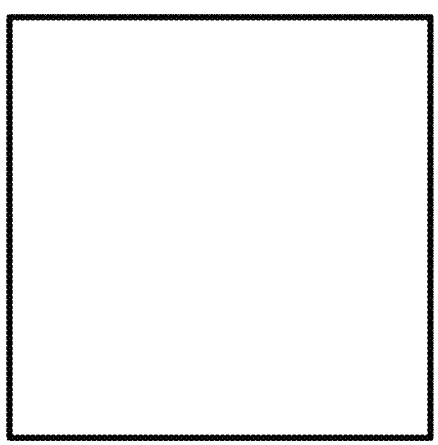
Figure 7D:
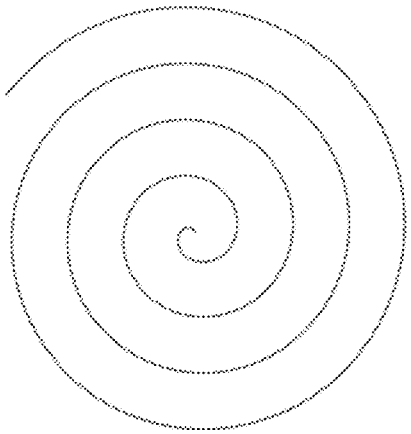

In one embodiment, the user can specify the metasurface by providing a list of scatterers and an uncompressed map (including the spatial arrangement) explicitly to the software application (e.g., via datasets that can be generated in a scripting language). The spatial arrangement can include a rectangular arrangement, a circular arrangement, a hexagonal arrangement, a spiral arrangement, or a chain arrangement as shown in respective FIGS. 7A-7E. Processing logic then receives the input data to identify the one or more consecutive ones of the plurality of scatterers in the spatial order. Here, a chain arrangement can refer to a series of chains (e.g., groups of scatterers of any size/shape) being connected (e.g., having adjacent scatterers) in a chained formation. Although FIG. 7E shows 4 chains, any number of chains is possible.

For an embodiment, processing logic can scan the first row of cells, followed by a next row of cells and so forth until the end of the structure to ensure the scatterers meet a minimum size, such as 2 by 2, 5 by 5, or so forth. A structure without consecutive scatterers or that does not the minimum size would not be processed for compression. Referring to FIG. 4B, for an example, processing logic can determine that the structure has at least two rows and two columns with a first row of {3, 1, 2, 2, 3, 3, 4, 1, . . . }. Processing logic starts at row=0 and initializes an empty sequence S. Processing logic identifies the first cell to be 3 and adds the cell 3 to the sequence S. While the content of sequence S is found in the dictionary, processing logic appends a next cell into sequence S until a unique sequence S is found.

At block 506, processing logic identifies a sequence (e.g., unique sequence S) representing consecutive ones of the plurality of geometries, the sequence being associated with one or more consecutive ones of the plurality of scatterers in the spatial order. Here, when a unique sequence S is found (e.g., the sequence S is not found in the dictionary), processing logic appends an index and its corresponding sequence of geometries S into the dictionary, and appends a reference to the index to the structure listing, where the index corresponds to the sequence S in the dictionary. Processing logic then can reference this index in the dictionary and/or the structure listing when the same sequence S appears subsequently in the metasurface structure.

Note that the term "geometry" is introduced here to refer to a unique individual scatterer found in entries of the dictionary. Consecutive ones of a plurality of geometries refers to a sequence of geometries found in the entries of the dictionary. "The plurality of scatters" refer to the scatterers of the metasurface structure.

At block 508, processing logic associates a two-dimensional coordinate to the sequence, the two-dimensional coordinate corresponding to a start position for where the consecutive ones of the plurality of geometries (e.g., the sequence) are located in the metasurface. Here, processing logic adds a location coordinate (x, y) to the referenced sequence in the structure listing to indicate a start location for the referenced sequence.

Subsequently, processing logic can iteratively identify different unique sequences remaining in the row and add them as new indices in the dictionary. These indices are available to be added as references to the structure listing accordingly. The same processing is applied to subsequent rows and so forth until processing logic traverses all cells in the metasurface structure. Note that a single dictionary file can be used among different rows of cells in the metasurface structure or can be used by one or more metasurface structures.

At block 510, processing logic generates an output layout file including the dictionary listing (as independent cells) and the structure listing, where the structure listing has references to the cells in the dictionary to build up the metasurface structure. Here, the dictionary and structure listings are generated and saved into the layout file, where repeating sequences are only stored once but can be referenced multiple times. The layout file can be a gdsII file, an oasis file, or files of other file formats.

For an embodiment, the system further instructs the fabrication of the metasurface device based on the output layout file using a lithographic process. The metasurface device stored in the files can be implemented by lithographic processes such photolithography, electron beam lithography, nano-imprint, etc. For example, a 40-millimeter (mm) metadata device may include over 5 billion elements. Each element includes nanometer-precision definitions of x, y position. Since these design files undergo computational processes such as data conversion or fracturing for use with mask writing equipment, it is desirable for the file sizes to be reduced or minimized. A large file size may limit fabrication sizes of the metasurface device to be no larger than a few millimeters. With the reduction in size, fabrication sizes of the metasurface device can be tens of millimeters.

For an embodiment, the layout representation is a two-dimensional array of metasurface scatterers arranged in a spatial order including a rectangular arrangement, a circular arrangement, a hexagonal arrangement, a spiral arrangement, or a chain arrangement.

For an embodiment, the system further stores the output layout file as a graphical design system binary file.

For an embodiment, the output layout file further includes a special value and associated coordinates corresponding to the special value, the special value indicating that there is absent of metasurface scatterers at the associated coordinates.

For an embodiment, the system further initializes the dictionary with a set of records of single unique metasurface scatterers. The dictionary (or dictionary listing) can be a collection of indexed sequences stored in the file independently of the structure listing.

For an embodiment, a dictionary including a plurality of records, and each record includes either a single unique metasurface scatterer or a unique sequence of metasurface scatterers.

For an embodiment, the system further appends the unique sequence of metasurface scatterers to the dictionary as a new record comprising appending the unique sequence of metasurface scatterers to the dictionary as references to two existing sequences of metasurface scatterers in the dictionary.

For embodiment, each sequence of metasurface scatterers in the dictionary includes references to two existing records in the dictionary in a hierarchical manner, and a count of metasurface scatterers in the sequence of metasurface scatterers is equal to a sum of counts of metasurface scatterers in the two existing records.

For an embodiment, a sequence of metasurface scatterers are identified as unique when the sequences of metasurface scatterers are not yet present in the dictionary.

For an embodiment, a subsequent sequence of metasurface scatterers in the metasurface structure are referenced to an index of a record in the dictionary when a subset of the subsequent sequences of metasurface scatterers match a sequence of metasurface scatterers in the record in the dictionary. The metasurface structure can stored in a structure listing. The structure listing can be a collection of referenced indexes and (x, y) coordinates, where the referenced indexes refer to the sequences in the dictionary listing.

The methods and systems described herein may be implemented using any suitable processing system with any suitable combination of hardware, software and/or firmware, such as described below with reference to the non-limiting examples of FIGS. 6A-6C.

Figure 6A:
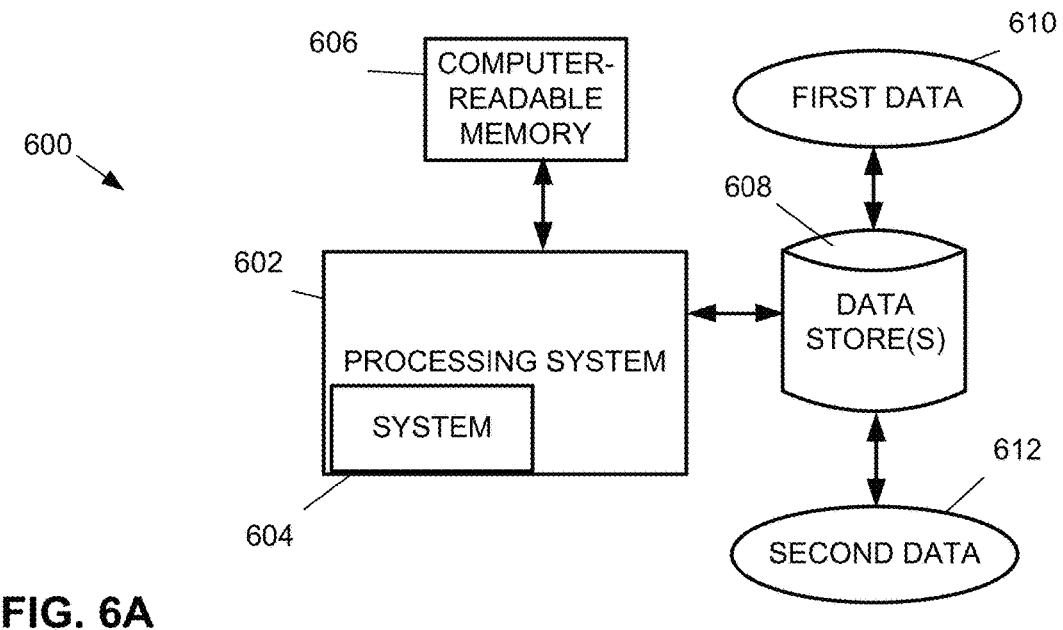
Figure 6B:
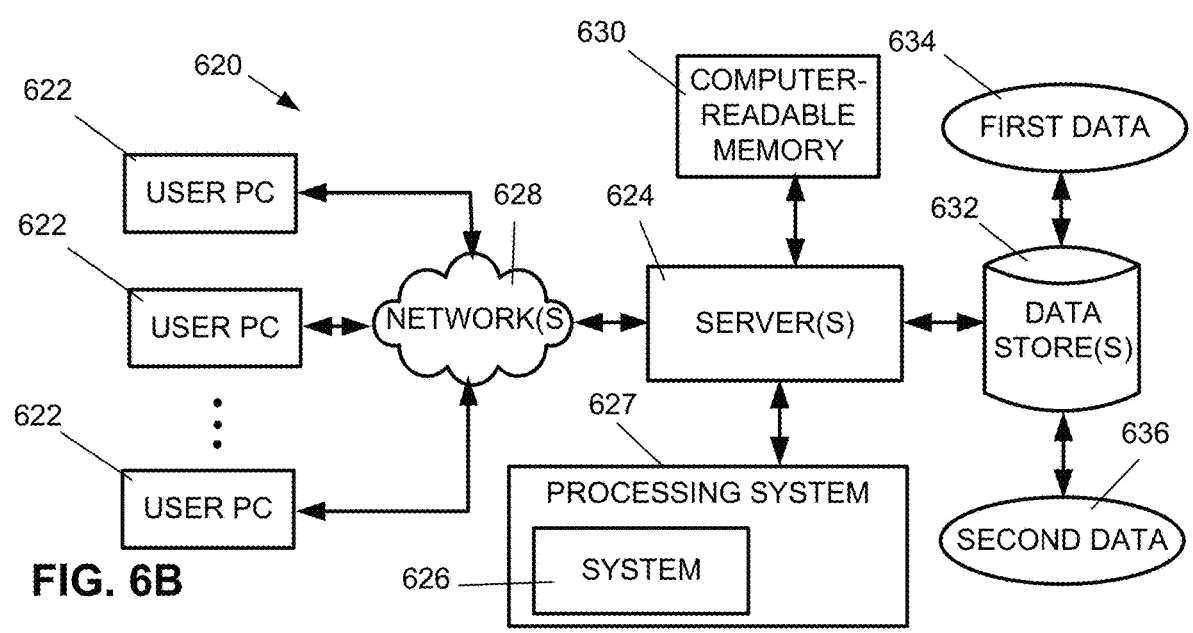

FIGS. 6A-6C depict example systems for use in implementing a system. For example, FIG. 6A depicts an exemplary system 600 that includes a standalone computer architecture where a processing system 602 (e.g., one or more computer processors) includes a system 604 being executed on it. The processing system 602 has access to a non-transitory computer-readable memory 606 in addition to one or more data stores 608. The one or more data stores 608 may contain first data 610 as well as second data 612.

FIG. 6B depicts a system 620 that includes a client server architecture. One or more user PCs 622 accesses one or more servers 624 running a system 626 on a processing system 627 via one or more networks 628. The one or more servers 624 may access a non-transitory computer readable memory 630 as well as one or more data stores 632. The one or more data stores 632 may contain first data 634 as well as second data 636.

FIG. 6C shows a block diagram of exemplary hardware for a standalone computer architecture 650, such as the architecture depicted in FIG. 16A, that may be used to contain and/or implement the program instructions of system embodiments of the present disclosure. A bus 652 may serve as the information highway interconnecting the other illustrated components of the hardware. A processing system 654 labeled CPU (central processing unit) (e.g., one or more computer processors), may perform calculations and logic operations required to execute a program. A non-transitory computer-readable storage medium, such as read only memory (ROM) 656 and random access memory (RAM) 658, may be in communication with the processing system 654 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 656 to be displayed on a display 670 in audio, graphic, or alphanumeric format. Communication with external devices may optionally occur using various communication ports 672.

In addition to the standard computer-type components, the hardware may also include data input devices, such as a keyboard 672, or other input device 674, such as a microphone, remote control, pointer, mouse, touchscreen and/or joystick.

This written description describes exemplary embodiments of the disclosure, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method to compress representations for a design of a metasurface device, the method comprising:

receiving a layout representation as a binary layout file, the layout representation representing a metasurface in the metasurface device, the metasurface including a plurality of scatterers arranged in a spatial order, each scatterer having one of a plurality of geometries;

identifying one or more consecutive ones of the plurality of scatterers in the layout representation in the spatial order;

identifying a sequence representing consecutive ones of the plurality of geometries in the layout representation, the sequence being associated with one or more consecutive ones of the plurality of scatterers in the spatial order;

associating a two-dimensional coordinate to the sequence, the two-dimensional coordinate corresponding to a position where the consecutive ones of the plurality of geometries are located according to the layout representation of the metasurface; and generating an output layout file including a reference to the sequence and the associated two-dimensional coordinate, the output layout file comprising a special value associated with coordinates, the special value indicating absence of metasurface scatterers associated with the coordinates.

2. The method of claim 1, further comprising instructing a fabrication of the metasurface device based on the output layout file using a lithographic process.

3. The method of claim 1, the layout representation is a two-dimensional array of metasurface scatterers arranged in a spatial order including a rectangular arrangement, a circular arrangement, a hexagonal arrangement, a spiral arrangement, or a chain arrangement.

4. The method of claim 1, further comprising storing the output layout file as a graphical design system binary file.

5. The method of claim 1, further comprising initializing a dictionary with a set of records of single unique metasurface scatterers.

6. The method of claim 1, a dictionary including a plurality of records, and each record includes either a single unique metasurface scatterer or a unique sequence of metasurface scatterers.

7. The method of claim 6, further comprising appending the unique sequence of metasurface scatterers to the dictionary as a new record comprising appending the unique sequence of metasurface scatterers to the dictionary as references to two existing sequences of metasurface scatterers in the dictionary.

8. The method of claim 6, each sequence of metasurface scatterers in the dictionary comprising references to two existing records in the dictionary in a hierarchical manner, and a count of metasurface scatterers in the sequence of metasurface scatterers is equal to a sum of counts of metasurface scatterers in the two existing records.

9. The method of claim 6, a sequence of metasurface scatterers being identified as unique when the sequence of metasurface scatterers are not yet present in the dictionary.

10. The method of claim 6, a subsequent sequence of metasurface scatterers in the metasurface device being referenced to an index of a record in the dictionary when a subset of the subsequent sequence of metasurface scatterers match a sequence of metasurface scatterers in the record in the dictionary.

11. A non-transitory machine readable medium storing executable instructions which when executed by a data processing system cause the data processing system to perform operations:
   receiving a layout representation as a binary layout file, the layout representation representing a metasurface in a metasurface device, the metasurface including a plurality of scatterers arranged in a spatial order, each scatterer having one of a plurality of geometries;
   identifying one or more consecutive ones of the plurality of scatterers in the layout representation in the spatial order;
   identifying a sequence representing consecutive ones of the plurality of geometries in the layout representation, the sequence being associated with one or more consecutive ones of the plurality of scatterers in the spatial order;
   associating a two-dimensional coordinate to the sequence, the two-dimensional coordinate corresponding to a position where the consecutive ones of the plurality of geometries are located according to the layout representation of the metasurface; and
   generating an output layout file including a reference to the sequence and the associated two-dimensional coordinate, the output layout file comprising a special value associated with coordinates, the special value indicating absence of metasurface scatterers associated with the coordinates.

12. The medium as in claim 11, the operations further comprising instructing a fabrication of the metasurface device based on the output layout file using a lithographic process.

13. The medium as in claim 11, the layout representation is a two-dimensional array of metasurface scatterers arranged in a spatial order including at least one row and at least one column of metasurface scatterers.

14. The medium as in claim 11, the operations further comprising storing the output layout file as a graphical design system binary file.

15. A data processing system, comprising:
   a processor; and
   a memory coupled to the processor to store instructions, which when executed by the processor, cause the processor to perform operations, the operations including:
      receiving a layout representation as a binary layout file, the layout representation representing a metasurface in a metasurface device, the metasurface including a plurality of scatterers arranged in a spatial order, each scatterer having one of a plurality of geometries;
      identifying one or more consecutive ones of the plurality of scatterers in the layout representation in the spatial order;
      identifying a sequence representing consecutive ones of the plurality of geometries in the layout representation, the sequence being associated with one or more consecutive ones of the plurality of scatterers in the spatial order;
      associating a two-dimensional coordinate to the sequence, the two-dimensional coordinate corresponding to a position where the consecutive ones of the plurality of geometries are located according to the layout representation of the metasurface; and
      generating an output layout file including a reference to the sequence and the associated two-dimensional coordinate, the output layout file comprising a special value associated with coordinates, the special value indicating absence of metasurface scatterers associated with the coordinates.

16. The system of claim 15, the operations further comprising instructing a fabrication of the metasurface device based on the output layout file using a lithographic process.

17. The system of claim 15, the layout representation is a two-dimensional array of metasurface scatterers arranged in a spatial order including at least one row and at least one column of metasurface scatterers.

18. The system of claim 15, the operations further comprising storing the output layout file as a graphical design system binary file.

* * * * *